No. 652,890.　　　　　　　　　　　　　　　Patented July 3, 1900.
G. H. CLARK.
PNEUMATIC TIRE.
(Application filed Nov. 13, 1899.)
(No Model.)
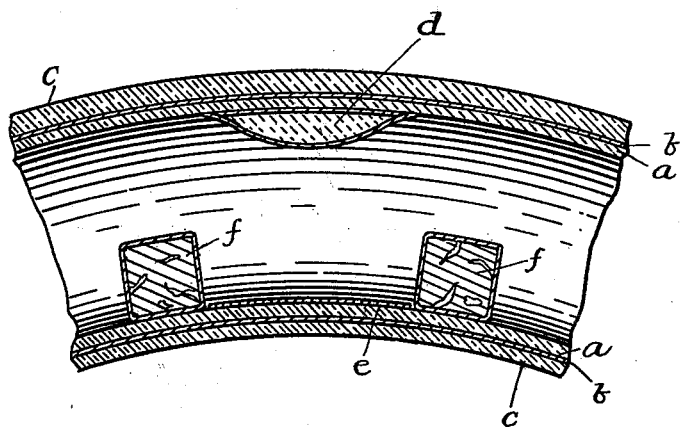
Witnesses:
H. B. Davis.
J. L. Hutchinson.
Inventor:
George H. Clark
by B. J. Hayes,
Atty

UNITED STATES PATENT OFFICE.

GEORGE H. CLARK, OF BOSTON, MASSACHUSETTS, ASSIGNOR TO THE CLARK CYCLE TIRE COMPANY, OF PORTLAND, MAINE.

PNEUMATIC TIRE.

SPECIFICATION forming part of Letters Patent No. 652,890, dated July 3, 1900.

Application filed November 13, 1899. Serial No. 736,764. (No model.)

*To all whom it may concern:*

Be it known that I, GEORGE H. CLARK, of Boston, county of Suffolk, and State of Massachusetts, have invented an Improvement in Pneumatic Tires, of which the following description, in connection with the accompanying drawings, is a specification, like letters on the drawings representing like parts.

In United States Patent No. 623,376, dated April 18, 1899, a pneumatic wheel-tire is shown having a sealed sack or pocket within it which contains a quantity of self-healing compound or material, said sealed sack or pocket being employed as a valve for inflation, which is pierced by a tubular needle adapted to be connected with an air-forcing device whenever it is desired to inflate the tire, and when said needle is withdrawn the puncture produced by its insertion is automatically sealed. When the tubular needle is thrust through the valve, it sometimes happens that its point penetrates the air-tube opposite the valve, and this invention has for its object to provide means whereby this trouble may be avoided; and to this end the invention consists in providing the air-tube with a protecting-plate opposite the valve for inflation, against which the point of the tubular needle will strike if introduced too great a distance; also, I find in practice that in case the tire shown in said patent becomes deflated accidentally or otherwise and any attempt is made to ride it when so deflated the valve for inflation becomes severely compressed, and sometimes the compression is so great as to burst the walls of the valve.

This invention also has for its object to provide means whereby this trouble may be avoided; and it consists in producing within the tire a recess opposite the valve for inflation which is adapted to receive said valve when the tire is deflated. One way of producing said recess consists in disposing within the tire—as, for instance, within the air-tube—two projections, one at each side of the valve, which limit the movement of the walls of the tire toward each other.

The drawing shows in longitudinal vertical section a sufficient portion of a pneumatic tire embodying this invention to illustrate the same.

In the tire which I have herein shown for the sake of illustrating my present invention, $a$ represents the air-tube, $b$ and $c$ the outer layers or wrappers thereon, and $d$ the valve for inflation, which is represented as a sealed sack or pocket containing a quantity of self-healing material or compound. On the interior of the air-tube $a$ a protecting-plate $e$ is placed, which is preferably a metallic plate of suitable shape and size to be applied to and also secured to the air-tube. This plate, as shown in the drawings, is located directly opposite the valve for inflation and serves as a means of preventing the air-tube from being punctured by the tubular needle which is thrust through the valve to inflate or deflate the tire. A copper plate I find in practice to be suitable for this purpose, yet I intend to include within the spirit and scope of this invention any means located opposite the valve which is adapted to accomplish this result.

$ff$ represent two projections located a short distance apart and forming a recess between them of sufficient size to receive the valve $d$ when the tire is deflated. These projections $ff$ may be composed of small pieces of cork covered or coated with rubber, as herein shown, or they may be made in any other suitable manner and they may be secured to the interior of the air-tube. It will be seen that when the tire is deflated movement of the opposite walls of the tire toward each other is limited by said projections $ff$, and also that a recess is formed between them of suitable size to receive the valve to protect it from undue compression. While I find in practice that such means effectually accomplishes the desired ends, yet I do not desire or intend to limit my invention in the particular way herein shown for producing the recess, as it is obvious that a recess for the valve may be formed or provided in many different ways which come within the spirit and scope of this invention.

I claim—

1. A pneumatic tire having a valve for inflation adapted to be pierced by a tubular needle and having a protecting-plate opposite said valve, substantially as described.

2. A pneumatic tire having a valve for inflation adapted to be pierced by a tubular needle and having a protecting-plate secured to the inside of the air-tube opposite said valve, substantially as described.

3. A pneumatic tire containing a valve for inflation and having a valve-receiving recess located opposite said valve, substantially as described.

4. A pneumatic tire containing a valve for inflation and having a valve-receiving recess located opposite said valve formed by projections which limit the movement of the opposite walls of the tire toward each other, substantially as described.

5. A pneumatic tire having within it a valve for inflation and projections in the air-tube opposite said valve which are located a short distance apart and which limit the movement of the walls of the tire toward each other, substantially as described.

6. A pneumatic wheel-tire having within it a valve for inflation and rubber-covered projections disposed within and secured to the air-tube opposite said valve which limit the movement of the walls of the tire toward each other, substantially as described.

In testimony whereof I have signed my name to this specification in the presence of two subscribing witnesses.

GEORGE H. CLARK.

Witnesses:
B. J. NOYES,
J. L. HUTCHINSON.